United States Patent [19]
Egan et al.

[11] 3,837,744
[45] Sept. 24, 1974

[54] SPECTROMETERS

[75] Inventors: Dale W. Egan, Montrose; Geoffrey B. Holstrom, Los Angeles; Harry C. Lord, Pasadena, all of Calif.

[73] Assignee: Environmental Data Corporation, Monrovia, Calif.

[22] Filed: Sept. 17, 1969

[21] Appl. No.: 858,802

[52] U.S. Cl. ............... 356/93, 250/237 G, 356/97
[51] Int. Cl. ................................................ G01j 3/42
[58] Field of Search .................. 356/82, 88, 93–98, 356/74, 79; 250/43.5, 218, 237 G

[56] References Cited
UNITED STATES PATENTS

| | | | |
|---|---|---|---|
| 3,052,154 | 9/1962 | Bolz | 356/99 X |
| 3,102,155 | 8/1963 | Vallee | 356/82 |
| 3,398,285 | 8/1968 | Sachs | 356/82 X |
| 3,518,002 | 6/1970 | Barringer et al. | 356/97 |

OTHER PUBLICATIONS

Leys: A Method of Background Correction For Direct Reading Emission Spectroscopic Trace Analysis Using Offset Exit Slits, Analytical Chemistry, Vol. 41, No. 2, February 1969, Pages 396–398.

*Primary Examiner*—Vincent P. McGraw
*Attorney, Agent, or Firm*—D. Gordon Angus; Donald D. Mon

[57] ABSTRACT

A spectrometer according to this disclosure includes optical means for receiving radiation from a region which may or may not contain particular materials to be monitored. Spectrum display means is provided for displaying the spectrum of received radiation. A first output means having first apertures is disposed to pass an image of absorption lines associated with the particular material being monitored, and second output means having second apertures is disposed to pass an image of continuum associated with the particular material.

15 Claims, 5 Drawing Figures

DALE W. EGAN,
GEOFFREY B. HOLSTROM,
HARRY C. LORD
INVENTORS.

BY Angus & Mon
ATTORNEYS.

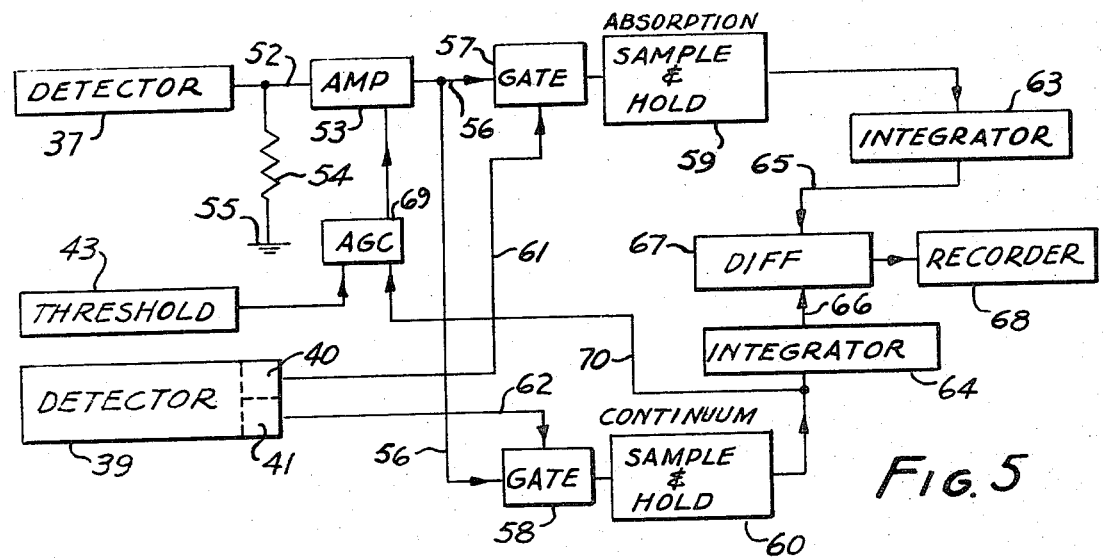
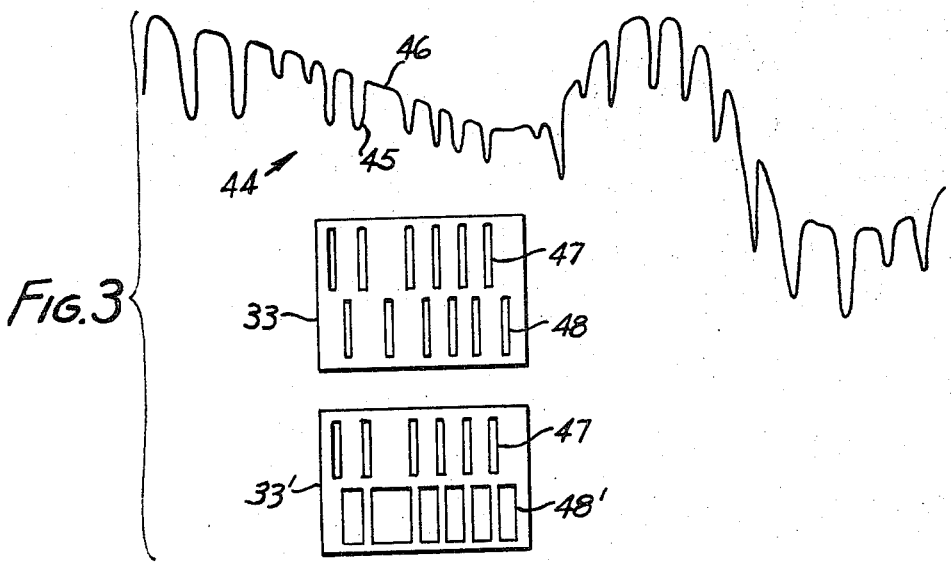
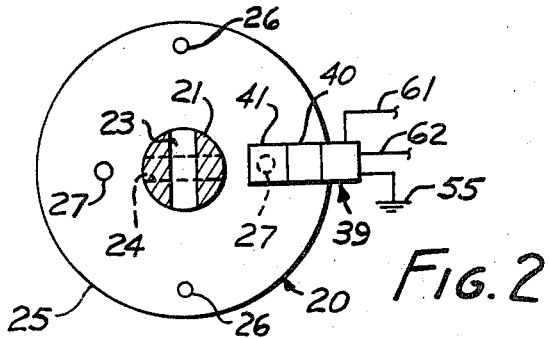
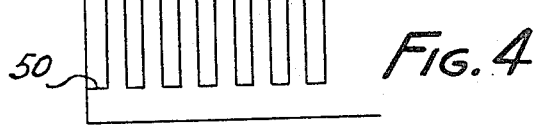

SPECTROMETERS

This invention relates to spectrometry, and particularly to spectrometric apparatus for analysis of gases and liquids.

The constituent parts of a material may be determined by a spectrometric analysis wherein radiation emitted from or passed through the material is analyzed. Atoms and molecules absorb or emit radiation at specific frequencies and the constituency of the composition may be determined by analyzing the spectrum to determine the frequencies absorbed or emitted, or absorption or emission lines as they are generally known. Every molecule composition of matter has its own identifiable signature of absorption or emission lines, and from the pattern of such lines in the spectrum associated with the material being analyzed, the constituent parts may be determined. Although the present invention will be described in connection with radiation absorption, it is to be understood that the present invention could be used for analysis of radiation emission as well.

Heretofore, spectrometers for use in gas analysis have utilized broadband radiation which is passed through the gas sample and thereafter analyzed for absorption lines. When the apparatus is used for detecting the presence of or quantity of particular gases, it has been convenient to employ multiple slits superimposed over the spectrum, the slits corresponding to the absorption lines of the gas being detected. Thus, only the absorption lines associated with the particular gas were passed by the multiple slits and absence of correspondence of the absorption lines with the slits indicated on absence of the gas. One problem with the foregoing type of gas analysis resided in the fact that the presence of other gases tended to affect the radiation being passed through the multiple slits. Particularly some other gases may have had some of the same absorption lines as the gas being monitored so that the slits may not have been able to distinguish between the gases. Also, background radiation in the spectrometer would be passed by the slits and affect automatic recorder devices associated therewith so that erroneous results were obtained.

One solution offered to overcome some of the foregoing problems in gas monitoring resided in the use of a continuously vibrating mask having slit apertures corresponding to the absorption lines of the gas being monitored. A radiation detector adapted to receive radiation passed by the mask provided output signals representative of periods of registration of the slit apertures with the absorption lines and other output signals representative of periods of non-registration of the slit apertures with the absorption lines. By comparing the signals detected during the period of registration with the signals detected during periods of non-registration, the incident background radiation could be determined and the effect of the background radiation may be eliminated.

Although the use of a vibrating mask in spectrometer gas monitoring provided an analysis of the characteristics of the absorption lines, of a particular gas, the presence of other gases could be passed by the mask during periods of registration as well as non-registration of the mask with the absorption lines of the particular gas being monitored and significant errors would occur. Thus, the vibrating mask technique for use in gas analysis did not provide optimum analysis of the spectral radiation, particularly the absorption region and the region of continuum (between the absorption lines).

It is an object of the present invention to provide improved gas analysis apparatus for detecting and analyzing compositions.

Another object of the present invention is to provide spectrometric apparatus capable of analyzing materials and accurately determining the quantity of constituent parts of such materials.

Another object of the present invention is to provide a spectrometer capable of monitoring particular composition in the material which provide optimum characteristics relating to both the absorption lines and the continuum of the spectrum of incident radiation.

Another object of the present invention is to provide an improved spectrometer for spectrometric analysis wherein particular materials monitored are analyzed through slit apertures corresponding to the absorption lines of the materials monitored and to the spectrum continuum of the materials monitored.

In accordance with the present invention, a spectrometer includes means for displaying the spectrum of radiation received from a region being monitored. First output means having first apertures passes images of the absorption lines of the material being monitored and second output means having second apertures passes images of the continuum of the spectrum of the material being monitored. Detectors may be positioned adjacent the apertures so that radiation received through the first and second apertures may be compared.

According to one feature of the present invention, divider means divides the radiation into two beams having a cross-sectional size of the same order of the apertures of the output means.

According to another optical and desirable feature of the present invention, chopper means is provided for pulsating the beam paths in successive alternate relationship.

According to another optical and desirable feature of the present invention, gain control means is provided for adjusting the gain an amplifier associated with the detector means in accordance with the intensity of the image of the continuum.

According to another optional and desirable feature of the present invention, an electronic circuit is provided for analyzing radiation detected by the detector means and for recording the results.

The above and other features of this invention will be more fully understood from the following detailed description and the accompanying drawings, in which:

FIG. 2 is a section view of a beam splitting apparatus for use in the spectrometer illustrated in FIG. 1;

FIG. 3 is an illustration of various slit assemblies for use in the spectrometer illustrated in FIG. 1, and their relationship to a typical spectrum;

FIG. 4 is a diagram of a signal received by a detector in the spectrometer illustrated in FIG. 1; and FIG. 5 is a schematic block diagram of electric circuitry associated with the optical spectrometer illustrated in FIG. 1.

Figure 1:
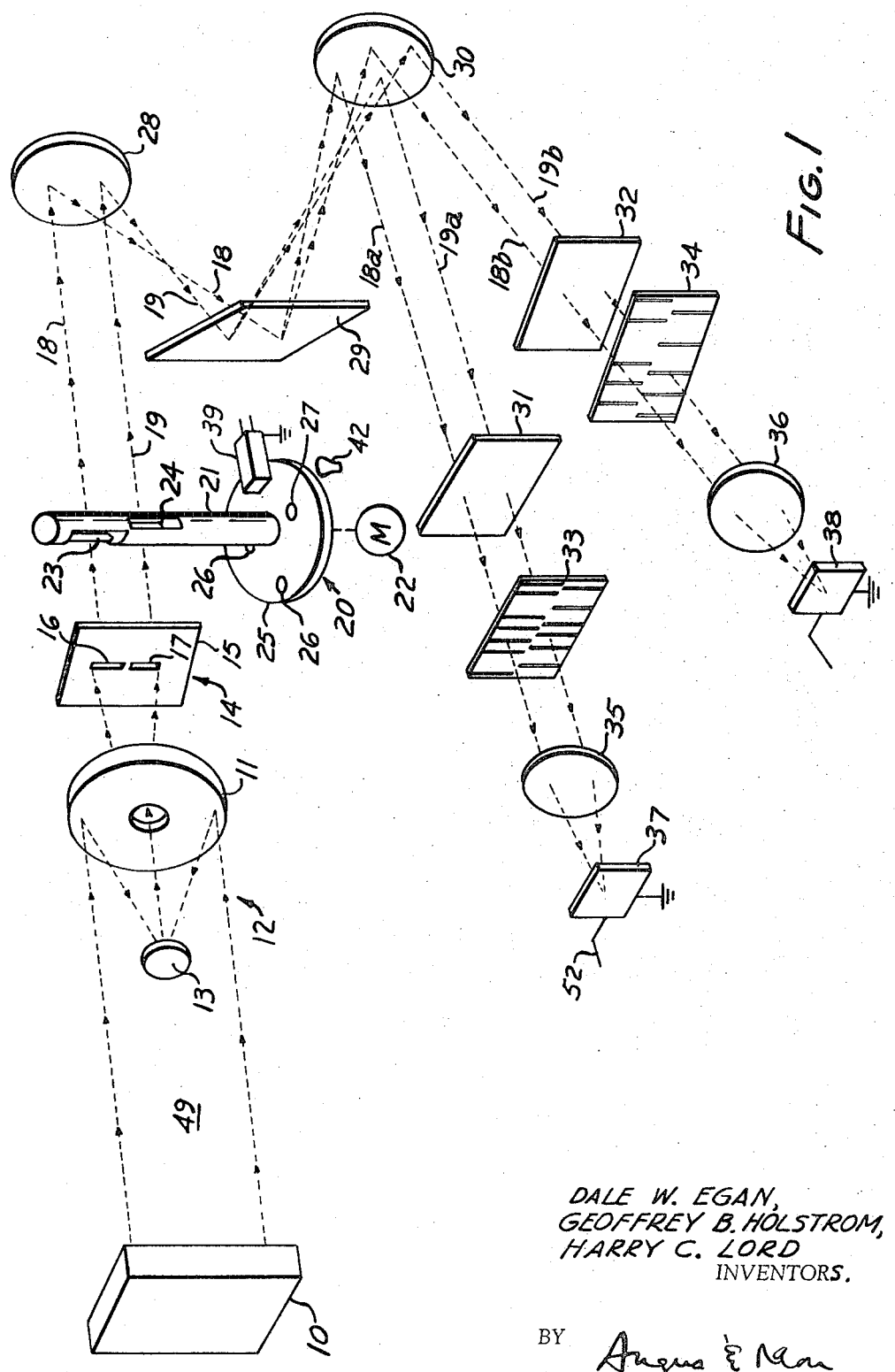
FIG. 1 is a schematic diagram illustrating the optics associated with a spectrometer in accordance with the presently preferred embodiment of the present invention.

In FIG. 1 there is illustrated a schematic diagram of the optical portions of a spectrometer according to the presently preferred embodiment of the present invention. The optical portion of the spectrometer includes a source of radiation 10 such as a broadband collimated light source as might be provided by a carbon filament or quartz-iodine lamp. Radiation from source 10 is reflected off reflector 11 of telescope 12 and onto reflecting lens 13 of the telescope which focuses an image of source 10 onto plate 15 of input slit assembly 14. Plate 15 carries a pair of slit apertures 16 and 17 disposed in an over and under relationship. Slit assembly 14 divides the radiation into a pair of beam paths 18 and 19, respectively.

Radiation chopper 20, which is illustrated in greater detail in FIG. 2, includes a shaft 21 adapted to be rotated about its axis by motor 22. Shaft 21 has a pair of apertures 23 and 24 disposed therethrough and oriented 90° from each other. Aperture 23 is positioned to pass radiation beam 18 and aperture 24 is positioned to pass radiation beam 19. Base 25 of chopper 20 is mechanically connected to motor 22 and includes apertures 26 and 27. As illustrated in FIG. 2 there are two apertures 26 aligned with aperture 23 and two apertures 27 aligned with aperture 24. The apertures 26 are disposed at a greater radius than the apertures 27.

Collimating mirror 28 is adapted to receive radiation beams 18 and 19 and reflect such beams to grating 29. Grating 29 disperses the entire beam to form a spectrum of radiation. The spectrum includes absorption lines representative of the constituent parts of the material in region 49 between source 10 and telescope 12. The spectrum is displayed on camera mirror 30 which reflects the image through separate ones of a plurality of filters 31, 32 and through one of output slit assemblies 33, 34 and one of lens 35, 36 to impinge on one of detectors 37, 38. The image passed by optical filter 31 comprises upper and lower beams 18a and 19a, respectively, which are passed through the upper and lower portions, respectively, of slit assembly 33 and focused by lens 35 onto detector 37. Likewise, a different portion of the spectrum is directed by camera mirror 30 as upper beam 18b and lower beam 19b through optical filter 32 and the upper and lower portions, respectively, of slit assembly 34 are focused by lens 36 onto detector 38. It is to be understood that any number of additional filters, slit assemblies, lenses and detectors may be associated with the apparatus for analyzing different portions of the spectrum displayed by grating 29. Filters 31 and 32 are order selecting filters so that specific radiation frequencies are passed therethrough for analysis of particular materials.

Housing 39 is operatively associated with the base 25 of radiation chopper 20 for purposes to be hereinafter explained. Housing 39 includes detectors 40 and 41 (FIG. 2) adapted to register with apertures 26 and 27, respectively. Light source 42 is disposed on the opposite side of base 25 from housing 39.

Referring to FIG. 3 there is illustrated a waveform 44 which is representative of a portion of the radiation spectrum displayed by grating 29. The spectrum includes regions of absorption illustrated as lines 45, ordinarily represented as inverse peaks in the waveform. Absorption lines 45 are separated by a region of high radiation intensity 46 known as continuum. In the lower portion of FIG. 3 there is illustrated two output slit assemblies 33 and 33'. Assembly 33 illustrates the preferred embodiment of an output slit assembly for use in the spectrometric apparatus in accordance with the present invention and includes a plurality of slits 47 disposed in the upper portion of the plate 33 and a plurality of slits 48 in the lower portion of plate 33. Apertures 47 correspond in location to each of several absorption lines 45 in waveform 44. Slits 48, which are approximately the same size as slits 47 are displaced from slits 47 so that they correspond to a region in the continuum of waveform 44 corresponding to zero or minimal absorption. Slit assembly 33' illustrated in FIG. 3 has the same apertures 47 in the upper portion thereof but the apertures 48' in the lower portion thereof corresponds to the entire continuum 46 of waveform 44 rather than just a portion of it as illustrated in slit assembly 33. For purposes to be hereinafter explained, slit assembly 33 is the preferred embodiment of the output slit assembly and offers advantages over the slit assembly 33'.

In operation of the apparatus as thus far described, radiation from source 10 passes through region 49 and is focused by telescope 12 onto plate 15 of input slit assembly 14. Gas to be analyzed is passed through region 49 so that radiation is received by telescope 12. The radiation is focused by telescope 12 onto slit assembly 14 and is passed through slits 16 and 17 and thereby divided into separate beams 18 and 19. Beam 18 passes through aperture 23 of chopper 20 and beam 19 passes through aperture 24 of chopper 20. Since apertures 23 and 24 are 90° out of phase and since chopper 20 is being continuously rotated by motor 22, radiation beams 18 and 19 constitute short intermittent, successive pulses of radiation. Thus, the radiation impinging collimating mirror 28 first reflects a short pulse of the upper beam 18 followed by a short pulse of the lower beam 19. The collimating mirror reflects the radiation onto grating 29 which disburses the radiation. The radiation spectrum is viewed by mirror 30 and the image of the spectrum passed through suitable filters 31 to slit assembly 33. The slit assembly is positioned so that the upper portion of slit assembly 33 passes only radiation in the absorption lines 45 (FIG. 3), whereas the lower portion of slit assembly 33 passes only radiation in the continuum of the spectrum. All radiation passed by the slit assembly is directed by lens 35 onto radiation detector 37.

During the period that the upper beam is passed by chopper 20, detector 37 detects only radiation from the region of the absorption lines of the gas being monitored whereas during the period that the lower beam is passed by chopper 40, the detector detects only radiation from a portion of the continuum between adjacent absorption lines of the monitored gas. The output signal detector 37 may be a light dependent resistor in combination with a voltage source so that as the intensity of incident radiation increases, the voltage drop across the resistor decreases and the voltage output increases. Alternatively, detector 37 may be a voltage generating device such as a photocell. The output signal produced by detector 37 in response to incident radiation might appear as illustrated in FIG. 4 with a relatively high voltage output during periods of detecting the continuum and a relatively low voltage output during periods of detecting the absorption line.

Incident background radiation will affect the radiation detected by detector 37 so that the signal output of the detector is in the form of the pulse waveform illustrated in FIG. 4. The quantity of gas being monitored, which determines the intensity and definition of the absorption lines, affects the signal amplitude of pulses 50 in the waveform in FIG. 4. Hence, an accurate determination of the quantity of gas being monitored may be determined by obtaining a ratio of the signal amplitude of pulses 50 to that of pulses 51. A circuit illustrated in FIG. 5 accomplishes this function.

As illustrated in FIG. 5 the output of light detector 37 is connected via lead 52 to the input of amplifier 53. Preferably, resistor 54 is provided between lead 52 and ground 55. The output of amplifier 53 is connected via lead 56 to the input of each of gates 57 and 58. The output of gate 57 is connected to sample and hold circuit 59 and the output of gate 58 is connected to the input of sample and hold circuit 60. Detector 40 is connected via lead 61 to the enable input of gate 57. Likewise, detector 41 is connected via lead 62 to the enable input of gate 58. The output of sample and hold circuit 59 is connected to integrator 63 and the output of sample and hold circuit 60 is connected to integrator 64. The output of integrator 63 is connected to input 65 of difference amplifier 67 and the output of integrator 64 is connected to the input 66 of difference amplifier 67. Difference amplifier 67 subtracts the signal appearing at input 66 from the signal appearing at input 65 and supplies an amplified resultant signal to recorder 68. The output of sample and hold circuit 60 is also connected via feedback loop 70 to automatic gain control (AGC) 69 which is connected to input amplifier 53. Threshold detector circuit 43 is also connected to automatic gain control 69.

The operation of the circuit illustrated in FIG. 5 may be explained with reference to FIGS. 1 and 2, and particularly with reference to the physical position of detectors 40 and 41 with respect to chopper 20 in FIGS. 1 and 2. As aperture 23 passes the upper beam 18, which of course forms the absorption signal 50 received by detector 37, light is passed by lamp 42 through aperture 26 to impinge on detector 40. Detector 40 provides an output signal at lead 61 to operate on gate 57. Thus, during the presence of an absorption signal 50, gate 57 is operated so that signal 50 is stored in sample and hold circuit 59 is integrated by integrator 63. During the next 90° rotation of chopper 20, the lower aperture 24 passes radiation to form beam 19 which of course impinges on the lower portion of mask 33 to form the continuum detected by detector 37. During this period of time light from lamp 42 passes through an associated aperture 27 to impinge on detector 41 causing a signal to appear on lead 62 to operate gate 58 so that signals received by detector 37 are passed by gate 58 to sample and hold circuit 60. During this period of time the detector, which is passing the lower portion 51 of the signal illustrated in FIG. 4, gate 58 causes the sample and hold circuit 60 to store signal 51 and provide a signal to integrator 64. Difference amplifier 67 subtracts signal 50 from signal 51 so that the output to recorder 68 is proportional to the ratio of the amplitude of signal 50 to 51.

To assure amplitude continuity of the ratio of signals 50 and 51, automatic gain control circuit 69 receives the continuum signal from sample and hold circuit 60 and operates on amplifier 53 to adjust the gain thereof. In the event of a change in intensity of the radiation in region 49, detector 37 detects the change in intensity so that both the absorption and continuum intensity is altered. However, continuum radiation represents the background radiation, and fluctuation of the intensity of the continuum is fed back through automatic gain control circuit 69 to operate on the gain of amplifier 53. Threshold detector 43 may be connected to automatic gain control 69 to turn off amplifier 53 in the event that the radiation is too low to obtain meaningful data.

The slit assembly 33 illustrated in FIG. 3 is the preferred embodiment of the output slit assembly for use in the spectrometer according to this invention. It is desired that the slits 47 and 48 be maintained approximately the same size as the slits 16 and 17 on the input slit assembly 14 to avoid stray radiation and to maintain the background radiation as low as possible. Also, it is desirable that slits 47 and 48 be approximately the same size and that the number of slits 47 be equal to the number of slits 48. If such were not the case, background radiation in the spectrometer would be unequally passed by the different portions of the output slit assembly, and additional calibration of the continuum radiation may be necessary. For this reason, it is desirable that the apertures 47 in the upper portion of slit assembly 33 have the same total area as the apertures 48 in the lower portion of the slit assembly so that the background radiation in the spectrometer is passed equally by both portions of the slit assembly and the effects of such background radiation are cancelled out by the difference amplifier 66 (FIG. 5).

It should be understood that it is possible that the lower portion of the slit assembly could have apertures 48' which encompass the entire continuum area of the spectrum of the gas being monitored, as illustrated in slit assembly 33' in FIG. 3. In this case, however, care should be taken to minimize the background radiation.

Slits 47 and 48 of the slit assembly are sized relative to the absorption lines that they are approximately equal to the width of the absorption lines at approximately their expected half peaks. Thus, variations of the intensity of the gas being monitored, which of course will have an effect on the intensity of the absorption lines, will be detected by detector 37. The slit assembly may be constructed by well-known photo-etching techniques utilizing the pattern of absorption lines of a known gas.

Another feature of the invention resides in the fact that in the event that several gases are present in region 49 being monitored, the output slit assembly may be designed to select only the absorption lines of the particular gas being monitored which is common to that gas and not common to any other gas present. Thus, as illustrated in FIG. 3, apertures 47 of slit assembly 33 are selectively aligned with certain absorption lines 45, and not others. Also, if one or more apertures prove to be unreliable in certain cases, they may be covered or otherwise made to prevent passage of the image of the associated absorption line.

As illustrated in FIG. 1, several gases may be monitored at the same time by providing separate output slit assemblies and detectors associated with each gas. For example, if region 49 contains carbon dioxide and carbon monoxide each having different absorption lines, separate slit assemblies 33 and 34 may be positioned to receive separate portions of the spectrum displayed by grating 29. Hence, the carbon dioxide might be monitored via beams 18a and 19a whereas the carbon monoxide might be monitored via beams 18b and 19b. Separate circuits and recorders as illustrated in FIG. 5 might be connected to detectors 37 and 38, respectively. Filters 31 and 32 selectively pass radiation relating to selected compositions.

The present invention thus provides spectrometry apparatus which is capable of detecting and monitoring gases. One or more gases may be detected at one time as illustrated in FIG. 1 in connection with the several filters, output slit assemblies and detectors. The apparatus is particularly useful for monitoring contaminants in the air and is capable of monitoring industrial processes for contaminants in gas and liquids.

This apparatus is highly effective and may be operated for substantial periods of time without maintenance. The apparatus is more reliable than previous spectrometric apparatus and is capable of accurately and reliably monitoring materials.

This invention is not to be limited by the embodiment shown in the drawings and described in the description, which is given by way of example and not of limitation.

What is claimed is:

1. In a spectrometer for monitoring a region for the presence of a particular material, said spectrometer including optical means for receiving radiation from said region, spectrum display means for producing and displaying the spectrum of radiation received by said optical means in a fixed position, the displayed spectrum including lines representative of absorption or emission of radiation by various materials in said region, the improvement comprising: first output means having first aperture means so disposed and arranged relative to said display means as to pass images of a plurality of said lines characteristic of the particular material; second output means having second aperture means so disposed and arranged relative to said display means as to pass images of continuum between a plurality of said lines characteristic of the particular material, said first and second output means being in fixed positions with respect to said display means; and detector means positioned to receive radiation passed through said first and second aperture means for producing a first signal having a magnitude dependent upon the incident radiation received through said first aperture means and for producing a second signal having a magnitude dependent upon the incident radiation received through said second aperture means.

2. Apparatus according to claim 1 further including means for obtaining a ratio of said second signal to said first signal.

3. Apparatus according to claim 1 further including divider means for dividing radiation received by said optical means into first and second paths, said spectrum display means displaying a first spectrum of the radiation in said first path and displaying a second spectrum of the radiation in said second path, said first output means viewing said first spectrum and said second output means viewing said second spectrum.

4. Apparatus according to claim 3 further including chopper means for alternatively blocking radiation along said first and second paths.

5. Apparatus according to claim 4 further including means connected to said chopper means for producing a first gating signal when said chopper means blocks said second radiation path and for producing a second gating signal when said chopper means blocks said first radiation path, first integrator means for integrating said first signal and second integrator means for integrating said seocnd signal, first gate means connected between said detector means and said first integrator means and responsive to said first gating signal for transmitting said first signal to said first integrator means, second gate means connected between said detector means and said second integrator means and responsive to said second gating signal for transmitting said second signal to said second integrator means, and difference means connected to said first and second integrator means for producing an output signal having a magnitude dependant upon the ratio between said first and second signals.

6. Apparatus according to claim 1 wherein said second aperture means is positioned relative to said first aperture means so that said second aperture means passes images of that area of the continuum having minimum intensity.

7. Apparatus according to claim 5 further including gain control means for controlling the level of said first and second signal magnitudes in accordance with the intensity of radiation received by said optical means from said region.

8. Apparatus according to claim 4 further including means for obtaining a ratio of said second signal to said first signal.

9. Apparatus according to claim 5 further including recorder means connected to said difference means for recording representations of said output signal.

10. Apparatus for analyzing incident radiation comprising:
   a. means for spatially dispersing said incident radiation to form a dispersion of radiation in a plane, said dispersion being composed of radiation zones of relatively high intensity and low intensity characteristic of a particular substance when the characteristic spectra of said substance are present in the incident radiation,
   b. first mask means having a plurality of relatively opaque and transparent regions, said regions being correlative with said relatively high intensity zones of said dispersion,
   c. second mask means having a plurality of relatively opaque and transparent regions, said regions being correlative with said relatively low intensity zones of said dispersion, said first and second mask means being positioned in said plane,
   d. means for cyclically passing said dispersed radiation alternately through said first mask means and said second mask means, said first and second mask means respectively being aligned with said relatively high and low intensity zones of said dispersion,
   e. a photodetector positioned for receiving light which has passed through said mask means, the photodetector producing an output signal proportional to the intensity of the light shining upon it, said output signal being modulated by an alternating current signal when said characteristic spectra are present in the incident radiation,
   f. means coupled to the photodetector for amplifying said alternating current signal separately from other components of said output signal, and
   g. means coupled to said amplifying means for measuring the level of the amplified alternating current signal independently of other components in said output signal.

11. Apparatus as claimed in claim 10 wherein the relative widths of the opaque and transparent regions of the first and second mask means is such that the transmissivity of the first and second mask to white light is substantially the same.

12. Apparatus for analyzing incident radiation comprising:
   a. means for spatially dispersing said incident radiation to form a dispersion of radiation in a plane, said dispersion being composed of radiation zones of maximum intensity alternating with radiation zones of minimum intensity, in the radiation spectrum, the spacing of the minimum intensity zones from each other as measured by wavelengths being non-identical to the spacing of the maximum intensity zones from each other as measured by wavelengths, said maximum intensity zones and minimum intensity zones being characteristic of a substance when the characteristic spectra of said substance are present in the incident radiation,
   b. first mask means having a plurality of relatively opaque and transparent regions, said regions being correlated with said maximum intensity zones of said dispersion,
   c. second mask means, non-identical to the first mask means, having a plurality of relatively opaque and transparent regions, said last mentioned regions being correlated with said minimum intensity zones of said dispersion, said first and second mask means being positioned in said plane,
   d. means for cyclically passing said dispersed radiation alternatively through said first mask means and said second mask means, said first and second mask means respectively being aligned with said maximum intensity zones and minimum intensity zones of said dispersion,
   e. a photo-detector positioned for receiving light which has passed through said mask means, the photodetector producing an output signal proportioned to the intensity of the light shining upon it, said output signal being modulated by an alternating current signal when said characteristic spectra are present in the incident radiation,
   f. means coupled to the photo-detector for amplifying said alternating current signal separately from other components of said output signal, and
   g. means coupled to said amplifying means for measuring the level of the amplified alternating current signal independently of other components in said output signal.

13. Apparatus according to claim 12 in which said radiation zones of maximum intensity are spaced non-uniform numbers of wavelengths apart and said regions of said first mask means are spaced corresponding non-uniform distances apart.

14. Apparatus according to claim 12 in which said minimum intensity zones are spaced non-uniform numbers of wavelengths apart and said regions of said second mask means are spaced corresponding non-uniform distances apart.

15. Apparatus according to claim 12 in which said radiation zones of maximum intensity are spaced non-uniform numbers of wavelengths apart and said region of said first mask means are spaced corresponding non-uniform distances apart, and said minimum intensity zones are spaced non-uniform numbers of wavelengths apart and said regions of said second mask means are spaced non-uniform distances apart corresponding to the last mentioned non-uniform numbers of wavelengths apart.

* * * * *

PC-1050
(5/69)

UNITED STATES PATENT OFFICE
CERTIFICATE OF CORRECTION

Patent No. 3,837,744      Dated September 24, 1974

Inventor(s) Dale W. Egan, Geoffrey B. Holstrom, Harry C. Lord

It is certified that error appears in the above-identified patent and that said Letters Patent are hereby corrected as shown below:

Col. 2, line 38,      "optical" should read --optional--

Col. 2, line 42,      "optical" should read --optional--

Col. 2, line 44,      after "gain" insert --of--

Col 8, line 11      "difference" should read --ratio--
Claim 5, line 16

Signed and sealed this 4th day of February 1975.

(SEAL)
Attest:

McCOY M. GIBSON JR.      C. MARSHALL DANN
Attesting Officer      Commissioner of Patents